(Model.)

T. MILTENBERGER.
REVOLVING SULKY HAY RAKE.

No. 255,445. Patented Mar. 28, 1882.

Witnesses.
E. S. Terrell
J. W. Shuffelton

Inventor.
Thos. Miltenberger

UNITED STATES PATENT OFFICE.

THOMAS MILTENBERGER, OF BELLEFONTAINE, OHIO.

REVOLVING SULKY HAY-RAKE.

SPECIFICATION forming part of Letters Patent No. 255,445, dated March 28, 1882.

Application filed November 15, 1881. (Model.)

*To all whom it may concern:*

Be it known that I, THOMAS MILTENBERGER, a citizen of the United States, residing at Bellefontaine, Logan county, Ohio, have invented a new and useful Improvement in Revolving Sulky Hay-Rakes, of which the following is a full and explicit description and specification.

Figure 1:
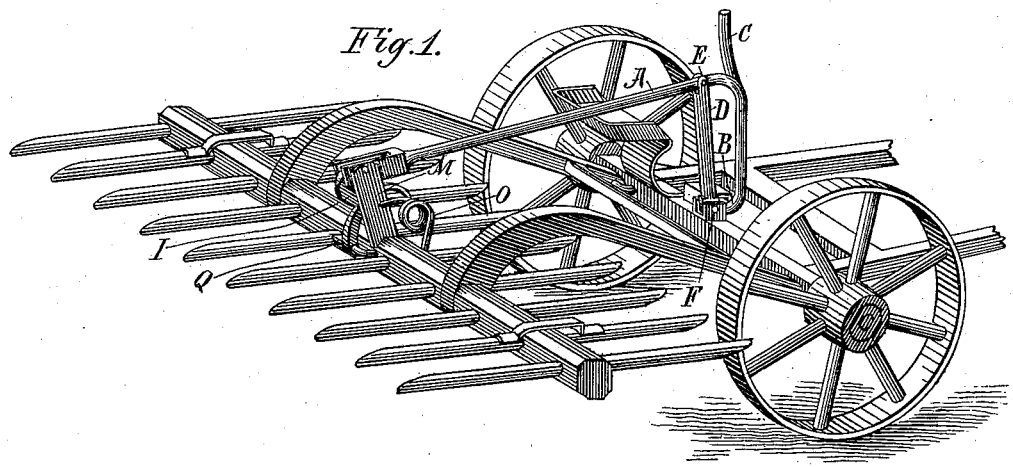
Figure 2:
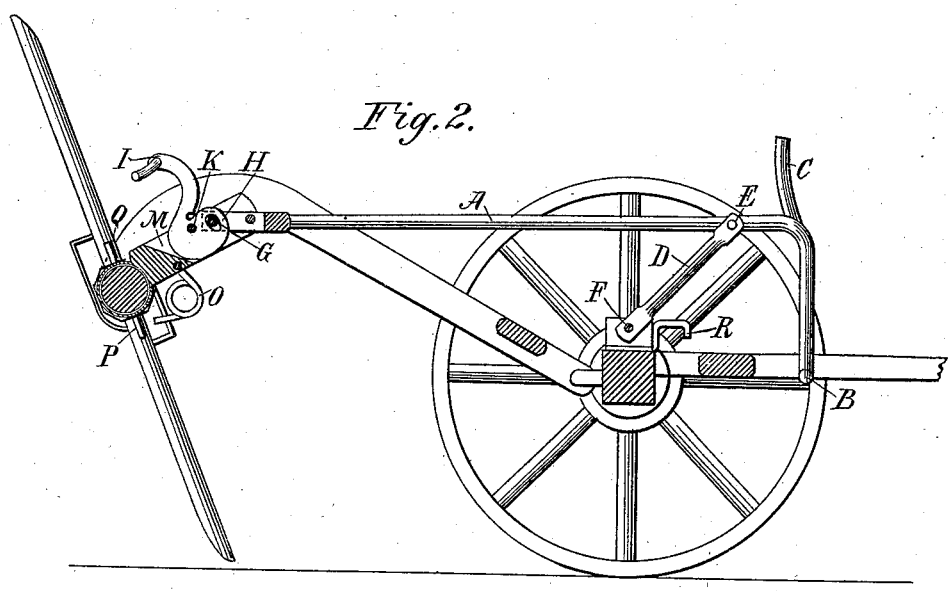

In the drawings, in which Figure 1 is a perspective view of a rake embodying my invention, and Fig. 2 a side elevation, partly in section, A is the operating-lever, having foot-lug B and handle C. D is the fulcrum, pivoted at F to the axle of the sulky and to the lever A at E. G is a pin in the bifurcated end of lever A, playing in curved slot H in trip-lever I. Trip-lever I is pivoted near its center at point K to oscillating standard M, carrying spring-trips O, and playing loosely on the axle of the rake. M is the oscillating standard, playing loosely on the axle of the rake, carrying spring-trips O on the front side, and having the trip-lever I, pivoted at K, on the rear. P Q are lugs on the axle of the revolving rake, on which the trip mechanisms O and I act.

In the operation of the machine the driver, sitting in the sulky-seat, controls the movements of the rake either by the handle C or the foot-lug B. By either of these means he can impart an upward or downward movement or a forward or backward movement to the lever A for the purpose of tilting the rake-teeth to clear obstructions, for revolving the rake or lifting the rake clear of the ground and securing it in position for carrying to and from work. When the rake is in position for raking, the driver, sitting in the sulky-seat, places his foot on lug B, and when the rake fills pushes the lug forward with his foot, causing lever A to tilt the oscillating standard M forward, releasing trip-lever I from lug Q, and causing spring-trip O to press lug P down, thus throwing the teeth of the rake down until their points come in contact with the ground, when the forward movement of the sulky revolves the rake, releasing the gathered hay, the spring-trip O being overcome by the weight of the rake and assuming its former position on top of lug P, or may be brought back with the lever.

While gathering, should it be desired to raise the points of the rake-teeth to clear obstructions, the lever A is moved backward by the foot-lug B or handle C, which causes trip-lever I to depress lug Q, thus throwing the front end of rake-teeth up. To clear larger obstructions, or to carry the rake, the front end of lever A is depressed and the foot-lug B locked under catch R.

My invention is superior to other revolving sulky hay-rakes in that one lever is made to answer the purpose of operating the revolving mechanism and raising the rake into carrying position; in being simpler in construction; in throwing the rear tilting mechanism out of contact with the rake-axle when the front one is operating to revolve the rake and still having the rear tilting mechanism ever ready to tilt the rake backward when desired; in having a tilting mechanism that releases the pressure on the rear side of the axle while it presses with increasing power on the tilting-lug on the front side of the axle, instead of a decreasing force sliding out from the axle, while pressing, gaining constantly a longer leverage, instead of coming closer to the axle.

What I claim as my invention is—

1. In combination with standard M and lever A, pivoted thereto, trip-lever I, having a curved slot, H, in the upper portion of its disk, through which plays a pin, G, in the rear end of lever A, and pivoted near its center to oscillating standard M, substantially as set forth.

2. In combination with the lever A and standard M, pivoted thereto, carrying spring-trips O, the trip-lever I, pivoted near its center to oscillating standard M, and having a curved slot, H, in the upper portion of its disk, through which plays a pin, G, in the rear end of lever A, substantially as described.

3. In combination with the revolving axle of the rake, provided with lugs P Q, the lever A and standard M, pivoted thereto, carrying spring-trip O, the trip-lever I, pivoted near its center to oscillating standard M, and having a curved slot, H, in the upper portion of its disk, through which plays a pin, G, in the rear end of lever A, substantially as set forth.

THOS. MILTENBERGER.

Witnesses:
J. D. McLAUGHLIN,
J. A. ODOR.